Oct. 6, 1964     W. JUDA     3,152,013
FUEL CELL
Filed May 17, 1960
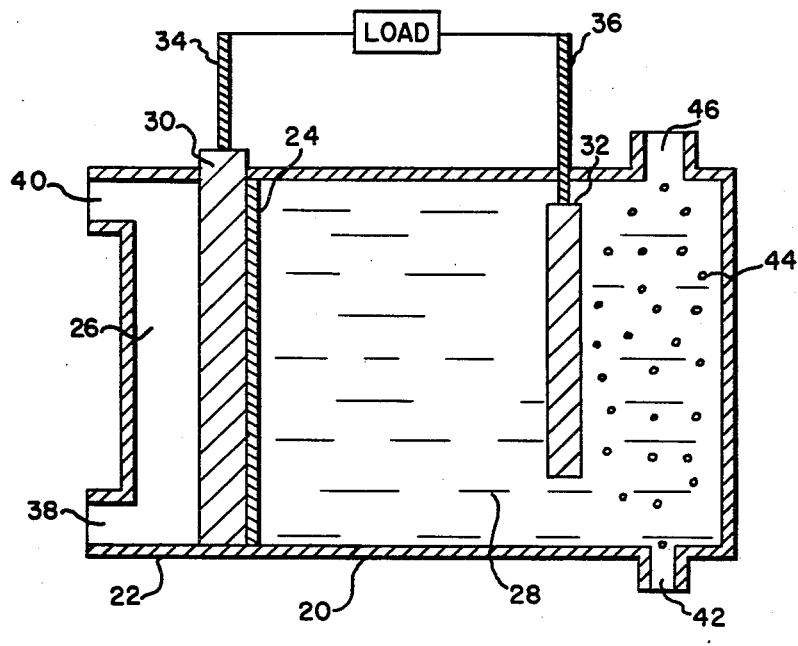
Inventor:
Walter Juda
by: *[signature]*
Attorney / 3,152,013
FUEL CELL
Walter Juda, Lexington, Mass., assignor to Ionics, Incorporated, Cambridge, Mass., a corporation of Massachusetts
Filed May 17, 1960, Ser. No. 29,617
9 Claims. (Cl. 136—86)

This invention relates to fuel cells, and more particularly to novel and improved fuel cell structures.

Fuel cells are known which operate to produce electrical power from the consumption of a fuel and an oxidant in an electrochemical reaction at the electrodes. One example of such a cell is a system in which hydrogen as fuel, and air or oxygen as an oxidizer, are fed respectively into catalyzing, diffusion-type electrodes separated by an electrolyte. It has been found that the current densities obtainable with hydrogen electrodes before polarization exceed by a considerable margin those obtainable with the best oxygen electrode in such a system. (See, for example, the discussion in the article appearing at pages 4 and 5 in the Journal F.D.I. Nachrichten, vol. 13–19, September 1959.)

Another type of fuel cell which differs from that previously described is the so-called "redox" fuel cell in which the fuel and oxidant consumed are not reacted at the electrode. A redox fuel cell has been defined as one in which a pair of redox electrodes are employed, the latter in turn being described as a combination of an electrolyte solution containing both the reduced and oxidized forms of an ionic species in contact with a suitable metallic conductor. The redox electrodes are separated from one another by an ion permeable membrane which maintains the electrical balance of the cell system by migration of hydrogen ion therethrough. The anolyte includes an intermediate reductant based upon a couple reaction such as the stannic-stannous couple or the $Ti^{+3}$–$Ti^{+4}$ couple. The catholyte similarly incorporates an intermediate, for example, an oxidant based upon a couple reaction such as the bromide-bromine couple. In such a system, the oxidation of $Ti^{+3}$ to $Ti^{+4}$ at one electrode and the corresponding reduction of the bromine to bromide at the other electrode produces power. The spent electrolytes are regenerated outside of the cell proper, in the one case as by oxidizing the bromide to the bromine with oxygen or air; in the other, by reducing the $Ti^{+4}$ back to $Ti^{+3}$ with a reducing fuel, e.g., hydrogen. Although the redox cell permits of good current densities, it necessarily requires the provision of regenerating chambers and liquid recirculating systems, and is therefore bulky and expensive. Additionally, where the catholyte is an alkaline solution, the use of air as an oxidant gas, with its normal constituent of carbon dioxide, will ultimately result in poisoning of the catholyte.

Therefore, one object of the present invention is to provide a novel fuel cell of compact form and high energy conversion efficiency from both half cells.

Yet another object of the present invention is to provide a fuel cell comprising an ion exchange membrane positioned between two electrodes, one of which is in electrical contact with the membrane, means for supplying fuel to said one of said electrodes, an electrolyte in contact with the membrane and the other electrode, a redox couple in said electrolyte, and means for supplying an oxidant gas for oxidizing said couple.

Other objects of the invention will in part be obvious and will in part appear hereinafter.

The invention accordingly comprises the apparatus possessing the construction, combination of elements, and arrangement of parts which are exemplified in the following detailed disclosure, and the scope of the application of which will be indicated in the claims.

For a fuller understanding of the nature and objects of the invention, reference should be had to the following detailed description taken in connection with the accompanying drawing which shows a schematic, sectional, side elevational view of a fuel cell embodying the principles of the present invention.

The invention comprehends the production of electrical power in a fuel cell wherein a fuel, scuh as hydrogen, is combined with a chemical oxidant couple produced by oxidation, as with air or oxygen, either inside or outside of the cell proper. The cell generally comprises a fuel electrode which may be of known construction and preferably is characterized in being a porous body capable of adsorbing the fuel and catalyzing it for the electrode reaction, being of course electrically conductive. Many such electrodes are described, for example, in Catalysis, Inorganic and Organic, Berkman, Morrel, and Egloff, Reinhold Publishing Company, New York (1940). The cell also includes an ion-permeable membrane, such a film including a cation-exchange resin, for instance, of the sulfonic or carboxylic type described in the literature, as in U.S. Patents 2,702,272, A. A. Kasper; 2,731,411, J. T. Clarke; and a host of others. In the preferred form of the invention, the membrane is in intimate electrical contact with the fuel electrode, for instance, electronically as by being coated thereon or bonded thereto, or by being physically displaced from the fuel electrode yet electrolytically coupled thereto by an electrolyte serving as a charge transport mechanism.

The fuel cell also includes a cathode which is so located as to be separated from the fuel electrode or anode by the membrane. The cathode is immersed or in contact with an aqueous electrolyte which is also in contact with the membrane. The aqueous electrolyte incorporates an oxidant couple, capable of being chemically regenerated, and which comprises a material in acid solution having an air oxidation potential sufficiently low so that most of the power is generated at the fuel electrode under high current densities. The oxidant couple preferably comprises a regenerable halogen couple or some other system as a ferric-ferrous system, such as the bromine-bromide system, the latter being considered therefore the active oxidant or, from another viewpoint, the latter may be considered an oxygen catalyst. The cathode is preferably formed of an electrically conductive material which is relatively stable toward the oxidant couple. One particular example of such material is carbon in graphitic form.

Means are provided for introducing an oxidant gas, such as air or oxygen, either directly into the catholyte, as in the preferred form, or into a regenerating chamber which is coupled with the catholyte space in the cell.

Referring now to the drawing, there is shown one embodiment of the invention in the form of a fuel cell indicated generally by the reference numeral 20 and which includes a substantially hollow container or casing 22. Disposed within casing 22 is a cation permeable membrane 24 so positioned transversely across the interior of the casing as to substantially divide the latter into two separate chambers 26 and 28. Located within chambers 26 and 28, respectively, are a first electrode or anode 30 and a second electrode or cathode 32. The relative thicknesses of the electrodes and the membrane as shown in the drawing have been exaggerated for the purposes of clarity in the description. Actually, the preferred form of membrane may be but a few mils in thicknes, the dimension not being particularly critical. The anode is preferably formed of an adsorbent material such as a porous body made of stainless steel, iron, copper oxide, cobalt oxide, and is activated with a catalyst such as platinum, iridium, rhodium, palladium, and the like. The anode may be formed solely of the catalytic metal itself in porous form. As shown in the drawing, the anode is intimately associated in physical and electrical (here electronic) contact with one side of the membrane.

Cathode 32, which is in spaced relationship to the membrane, is so dimensioned as to allow reasonably free circulation of a liquid catholyte, both around the cathode and through the interspace between the cathode and the membrane. Cathode 32 is preferably formed of a thin film of a noble metal, such as platinum, iridium, gold, etc. coated upon an electrolytic valve metal such as titanium, columbium, tantalum and the like. Electrically conductive members, such as leads 34 and 36, are respectively connected to the anode and to the cathode, thereby providing terminals from which electrical power generated by the cell may be drawn.

Chamber 26 includes a first opening or inlet port 38 therein, and through which fuel gas is supplied to the anode. Chamber 26 also includes a second opening or outlet port 40 through which impurities and incombustible materials injected into the chamber with the fuel gas, or any inert reaction products, are exhausted.

In a similar manner, chamber 28 is provided with a first opening or inlet port 42 through which either an oxidizing gas such as oxygen or an oxidized oxidant couple in solution is fed into the chamber. In the embodiment shown in the drawing, the space within chamber 28 surrounding the cathode is substantially occupied by an acid catholyte 44 which includes therein an intermediate oxidant couple. Inlet 42 is employed for introducing an oxidant gas directly into the catholyte for regenerating reduced oxidant couple by oxidation thereof. Chamber 28 includes an outlet port 46 whence waste gases such as carbon dioxide and nitrogen (in the event of the use of air as an oxidant) may be removed or vented.

Among the fuel gases suitable for use at the anode of the invention, hydrogen and hydrogen-containing gases are especially preferred, the latter group including such common fuels as water gas, reformed natural gas, producer gas and the like, and methanol vapor at elevated temperatures. Additionally, gaseous hydrocarbons such as methane, coal gas, mixture of carbon monoxide and hydrogen produced by reaction of water with hydrocarbons or by the partial oxidation of hydrocarbons, etc., may be used with appropriate catalysts.

In the embodiment shown, membrane 24 is a cation permeable membrane the fuel gas preferably employed therewith being hydrogen, and the oxidant being air. The reaction product of the cell is water formed by the oxidation of the hydrogen with relase of electrical energy. The reaction at anode 30 may be described as $$H_2 \rightarrow 2H^+ + 2e$$

Where the oxidant material or oxidant couple included within the catholyte is, for instance, the $Br-Br^-$ couple, the reaction at cathode 32 is as follows:

$$Br_2 \rightarrow 2Br^- - 2e$$

Where oxygen is employed as the oxidant, the regeneration reaction upon passing the oxygen through the reduced catholyte is as follows:

$$\tfrac{1}{2}O_2 + 2H^+ + 2Br^- \rightarrow H_2O + Br_2$$

It should be noted that, as well known in the art, the latter reaction is catalyzed by a material such as $NO_2$.

Although the cell shown in the drawing comprises a plurality of substantially sheet-like elements disposed within a casing, thereby providing a configuration which is advantageously shaped for many purposes, alternative constructions may be made without essentially altering the chemical or electrical characteristics of the cell. For instance, one electrode can be formed as a cylindrical element disposed concentrically within and separated from the other electrode similarly formed as a cylinder with a large diameter. In such a cell, the membrane also is cylindrical and separates the two electrodes one from the other. A space provided between the cathode and the membrane is filled with the catholyte containing the oxidant couple. Other shapes for particular purposes will be apparent.

The following are examples illustrative of operation of the fuel cell of the invention and are not to be construed as limiting other than as defined in the claims.

In Examples 1 to 3 following, properties of a number of fuel cells are described in which is employed a cation premeable membrane prepared by the sulfonated polystyrene method of manufacture disclosed in U.S. Patent No. 2,731,411, issued January 17, 1956. In all of the examples this membrane is employed in the hydrated form, the fuel used being hydrogen and the oxidant being oxygen, both of the gases being supplied at room temperature at approximately atmospheric pressure.

*Example 1*

A fuel cell corresponding to that shown in the drawing is prepared employing a 20-mil sheet of a cation permeable membrane as referred to in the previous paragraph, positioned in intimate physical and electrical contact with a porous stainless steel anode sheet catalyzed with platinum. The electrode and membrane area is 25 cm.² On the opposite side of the membrane in spaced relation thereto is located a cathode of expanded platinized titanium prepared according to the disclosure in U.S. Patent No. 3,117,023, issued January 7, 1964. The cathode is immersed in a catholyte in contact with the membrane, compounded as follows:

KBr ------------------------------------- g./liter-- 250
$Br_2$ -------------------------------------- ml-- 20
HBr -------------------------------------- ml-- 20
Distilled water as needed.

The cell, when supplied with hydrogen at the anode and a mixture of oxygen and $NO_2$ catalyst, bubbled through the catholyte, had an open circuit potential of 0.98 volt, and an operating potential of 0.7 volt at 10 milliamperes per cm.² at room temperature.

*Example 2*

The cell of this example differs from the cell of Example 1 in that no $NO_2$ catalyst need be employed with the oxygen deliverded to the catholyte, and in the composition of the catholyte solution. The latter was made up as follows:

KI -------------------------------------- g./liter-- 250
$I_2$ ---------------------------------------- g--- 50
HI --------------------------------------- ml-- 15
Distilled water as needed.

This cell has an open circuit voltage of 0.5 volt, and delivers a current of 10 milliamperes per cm.² and an operating voltage of approximately 0.3 volt at ambient temperatures.

*Example 3*

The cell of this example differs from the cell of Example 2 in the composition of the catholyte which was made up as follows:

|   | M |
|---|---|
| $Fe_2(SO_4)_3$ | .5 |
| $FeSO_4$ | .5 |
| $H_2SO_4$ | .25 |

The cell had an open circuit potential of 0.6 volt, and at an operating potential of 0.4 volt delivered a current of 5 milliamperes per cm.²

*Example 4*

A fuel cell is prepared with a cation membrane as used in Example 1 in spaced relation to a stainless steel, platinized anode electrolytically coupled to the membrane with a 31% $H_2SO_4$ solution anolyte. The catholyte was mixed as follows:

| | | |
|---|---|---|
| KBr | g./liter | 300 |
| $Br_2$ | g./liter | 50 |
| HBr | ml | 50 |

Distilled water as required.

The open circuit potential of the cell was 1.0 volt, the current density in operation at room temperature being 0.7 volt at 10 milliamperes per cm.$^2$.

*Example 5*

A cell constructed as in Example 1 was supplied with carbon monoxide as the fuel at the anode. The open circuit potential of this cell was 0.85 volt, the current density at room temperature being 4.5 milliamperes per cm.$^2$ at 0.6 volt.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A gaseous fuel cell comprising a cation-selective permeable membrane, a gas permeable catalytic electrode, a second electrode, said membrane being positioned between said electrodes and in electrical contact only with said gas permeable electrode, an aqueous catholyte in contact with said second electrode and said membrane, said catholyte including an oxidant couple therein, means for supplying a fuel gas to said permeable electrode, and means for supplying a gaseous oxidant to said catholyte for oxidizing reduced oxidant material.

2. A fuel cell as defined in claim 1 wherein said fuel gas is hydrogen.

3. A fuel cell as defined in claim 1 wherein said fuel gas is carbon monoxide.

4. A fuel cell as defined in claim 1 wherein said gaseous oxidant is oxygen.

5. A fuel cell as defined in claim 1 wherein said gaseous oxidant is air.

6. A fuel cell as defined in claim 1 wherein said oxidant couple is a bromine-bromide chemical couple.

7. A fuel cell as defined in claim 1 wherein said oxidant couple is an iodine-iodide couple.

8. A fuel cell as defined in claim 1 wherein said oxidant couple is a ferric-ferrous couple.

9. A fuel cell comprising, in combination, a cation-selective permeable membrane, a gas permeable catalytic fuel anode, a cathode, said membrane being positioned between the electrodes and in electrical contact only with said fuel anode, an aqueous acid catholyte in contact with both said cathode and said membrane, said catholyte including both elemental and ionized forms of an element selected from a group consisting of bromine and iodine, means for supplying a gaseous oxidant to said catholyte for oxidizing said ionized form to said elemental form, and means for supplying a fuel to said anode.

References Cited in the file of this patent

UNITED STATES PATENTS

| 2,901,522 | Bopp | Aug. 25, 1959 |
| 2,913,511 | Grubb | Nov. 17, 1959 |
| 3,061,658 | Blackmer | Oct. 30, 1962 |

OTHER REFERENCES

Status Report on Fuel Cells, PB 151804, U.S. Dept. of Commerce, June 1959, pages 20 and 60–62.